(12) United States Patent
Satou

(10) Patent No.: US 10,101,584 B2
(45) Date of Patent: Oct. 16, 2018

(54) MOUNTING STRUCTURE FOR HEAD UP DISPLAY

(71) Applicant: CALSONIC KANSEI CORPORATION, Saitama (JP)

(72) Inventor: Takeshi Satou, Saitama (JP)

(73) Assignee: CALSONIC KANSEI CORPORATION, Saitama (JP)

( * ) Notice: Subject to any disclaimer, the term of this patent is extended or adjusted under 35 U.S.C. 154(b) by 0 days.

(21) Appl. No.: 15/126,399

(22) PCT Filed: Jan. 23, 2015

(86) PCT No.: PCT/JP2015/051831
§ 371 (c)(1),
(2) Date: Sep. 15, 2016

(87) PCT Pub. No.: WO2015/146261
PCT Pub. Date: Oct. 1, 2015

(65) Prior Publication Data
US 2017/0082856 A1    Mar. 23, 2017

(30) Foreign Application Priority Data
Mar. 24, 2014    (JP) ................... 2014-060357

(51) Int. Cl.
*G02B 27/00*    (2006.01)
*G02B 27/01*    (2006.01)
(Continued)

(52) U.S. Cl.
CPC .......... *G02B 27/0149* (2013.01); *B60K 35/00* (2013.01); *B60K 37/04* (2013.01);
(Continued)

(58) Field of Classification Search
CPC ............ G02B 27/0149; G02B 27/0101; B60K 35/00; B60K 37/04; B60R 11/0229
See application file for complete search history.

(56) References Cited

U.S. PATENT DOCUMENTS 4,740,780 A * 4/1988 Brown ................... G02B 27/01
345/7
4,806,904 A * 2/1989 Watanuki ........... G02B 27/0149
340/438
(Continued)

FOREIGN PATENT DOCUMENTS

CN    103085635           5/2013
DE    EP 1972483 A1 *  9/2008  ......... B60H 1/00564
(Continued)

OTHER PUBLICATIONS

International Search Report dated Mar. 10, 2015 in International (PCT) Application No. PCT/JP2015/051831.

*Primary Examiner* — Bihn Tran
*Assistant Examiner* — Douglas Burtner
(74) *Attorney, Agent, or Firm* — Wenderoth, Lind & Ponack, L.L.P.

(57) ABSTRACT

A head up display unit can be provided in an inner portion of an instrument panel. A column bracket for mounting a steering column is at a lower portion of a vehicle body strength member and extends in a vehicle width direction in a vehicle rear side of a front wall panel of a vehicle interior. The head up display unit is mounted on the column bracket so as to be movable to a vehicle upward direction by an emergency input load from a vehicle front direction.

5 Claims, 8 Drawing Sheets

(51) Int. Cl.
  *B60K 35/00* (2006.01)
  *B60K 37/04* (2006.01)
  *B60R 11/02* (2006.01)

(52) U.S. Cl.
  CPC ...... *B60R 11/0229* (2013.01); *G02B 27/0101* (2013.01); *B60K 2350/2004* (2013.01); *B60K 2350/2052* (2013.01); *B60K 2350/941* (2013.01); *G02B 2027/015* (2013.01); *G02B 2027/0141* (2013.01); *G02B 2027/0154* (2013.01); *G02B 2027/0161* (2013.01)

(56) References Cited

U.S. PATENT DOCUMENTS

| | | | | |
|---|---|---|---|---|
| 4,961,548 | A * | 10/1990 | Adams | B64C 13/06 244/118.5 |
| 5,028,912 | A * | 7/1991 | Iino | G01P 1/08 340/461 |
| 7,084,859 | B1 * | 8/2006 | Pryor | G01C 21/3664 345/156 |
| 2002/0063778 | A1 | 5/2002 | Kormos | G01C 21/365 348/148 |
| 2003/0223133 | A1 * | 12/2003 | Raines | G02B 27/0149 359/841 |
| 2007/0205881 | A1 * | 9/2007 | Breed | B60C 23/041 340/447 |
| 2007/0271014 | A1 * | 11/2007 | Breed | B60J 10/00 701/31.9 |
| 2008/0065291 | A1 * | 3/2008 | Breed | B60N 2/002 701/36 |
| 2008/0122799 | A1 * | 5/2008 | Pryor | G06F 3/0312 345/173 |
| 2008/0158096 | A1 * | 7/2008 | Breed | B60N 2/002 345/7 |
| 2009/0043441 | A1 * | 2/2009 | Breed | G06K 7/10178 701/31.9 |
| 2009/0200784 | A1 * | 8/2009 | Braun | B62D 25/14 280/779 |
| 2009/0267921 | A1 * | 10/2009 | Pryor | B60K 35/00 345/177 |
| 2009/0273563 | A1 * | 11/2009 | Pryor | B60K 35/00 345/157 |
| 2010/0253594 | A1 * | 10/2010 | Szczerba | G01S 13/723 345/7 |
| 2010/0253599 | A1 * | 10/2010 | Szczerba | G01S 13/723 345/7 |
| 2012/0018989 | A1 * | 1/2012 | Breed | B60R 21/01516 280/735 |
| 2012/0184196 | A1 | 7/2012 | Kasai | |
| 2016/0200366 | A1 * | 7/2016 | Sanjo | B62D 25/145 296/70 |

FOREIGN PATENT DOCUMENTS

| | | |
|---|---|---|
| EP | 1 972 483 | 9/2008 |
| JP | 63-133417 | 8/1988 |
| JP | 2003-118426 | 4/2003 |
| JP | 2003-300426 | 10/2003 |
| JP | 2010-64708 | 3/2010 |
| JP | 2010-167830 | 8/2010 |
| JP | 2011-184006 | 9/2011 |

* cited by examiner

T1>T2

MOUNTING STRUCTURE FOR HEAD UP DISPLAY

CROSS-REFERENCE TO RELATED APPLICATION

This application is based upon and claims the benefit of priority to Japanese Patent Application No. 2014-060357, filed on Mar. 24, 2014, the entire disclosures of which are incorporated herein by reference.

TECHNICAL FIELD

The present invention relates to a mounting structure for a head up display.

BACKGROUND ART

A head up display apparatus that can display operation information, etc., superimposed on a scene viewed through a windshield of a vehicle exists (for example, see JP 2003-300426 A).

In recent years, a demand to increase displayable information quantity by widening a display area of the head up display apparatus increases. A demand to increase a size of a head up display unit constituting the head up display apparatus therefore increases.

Technical Problem

However, an instrument panel does not have a spare space in an inner portion thereof, since a load absorbing structure configured to absorb an emergency input load from a vehicle front direction by collapsing due to the load is disposed in the inner portion of the instrument panel. It is therefore difficult to directly provide a large-sized head up display unit in the inner portion of the instrument panel.

SUMMARY

A main object of the present invention is to reasonably provide a large-sized head up display unit in an inner portion of an instrument panel.

Solution to Problem

To solve the above problem, a mounting structure for a head up display includes a vehicle body strength member disposed at a vehicle rear side of a front wall panel of a vehicle interior and extending in a vehicle width direction, a column bracket provided at a lower portion of the vehicle body strength member and that mounts a steering column, and a head up display unit. The head up display unit is mounted on the column bracket to be movable to a vehicle upward direction by an emergency input load from a vehicle front direction.

Advantageous Effects

The following advantageous effect can be acquired by the above configuration. That is to say, the head up display unit is mounted on the column bracket to be movable to the vehicle upward direction. The head up display unit can be thereby efficiently mounted on a front portion of the vehicle interior with space-saving, and the head up display unit can be separated from the vehicle body strength member or the steering column in response to the emergency input load from the vehicle front direction and retracted to the vehicle upward direction alone. As a result, it can be prevented that the head up display unit evacuates the vehicle body strength member or the steering column by the emergency input load from the vehicle front direction. With this, it is possible to reasonably provide a large-sized head up display unit having much information that can display in an inner portion of an instrument panel.

DETAILED DESCRIPTION OF EMBODIMENTS

An embodiment according to the present invention will be described hereinafter in detail with reference to the accompanying drawings. FIGS. 1 to 10 illustrate the embodiment.

Embodiment 1

<Configuration>

A configuration of the embodiment is described hereinafter.

Figure 1:
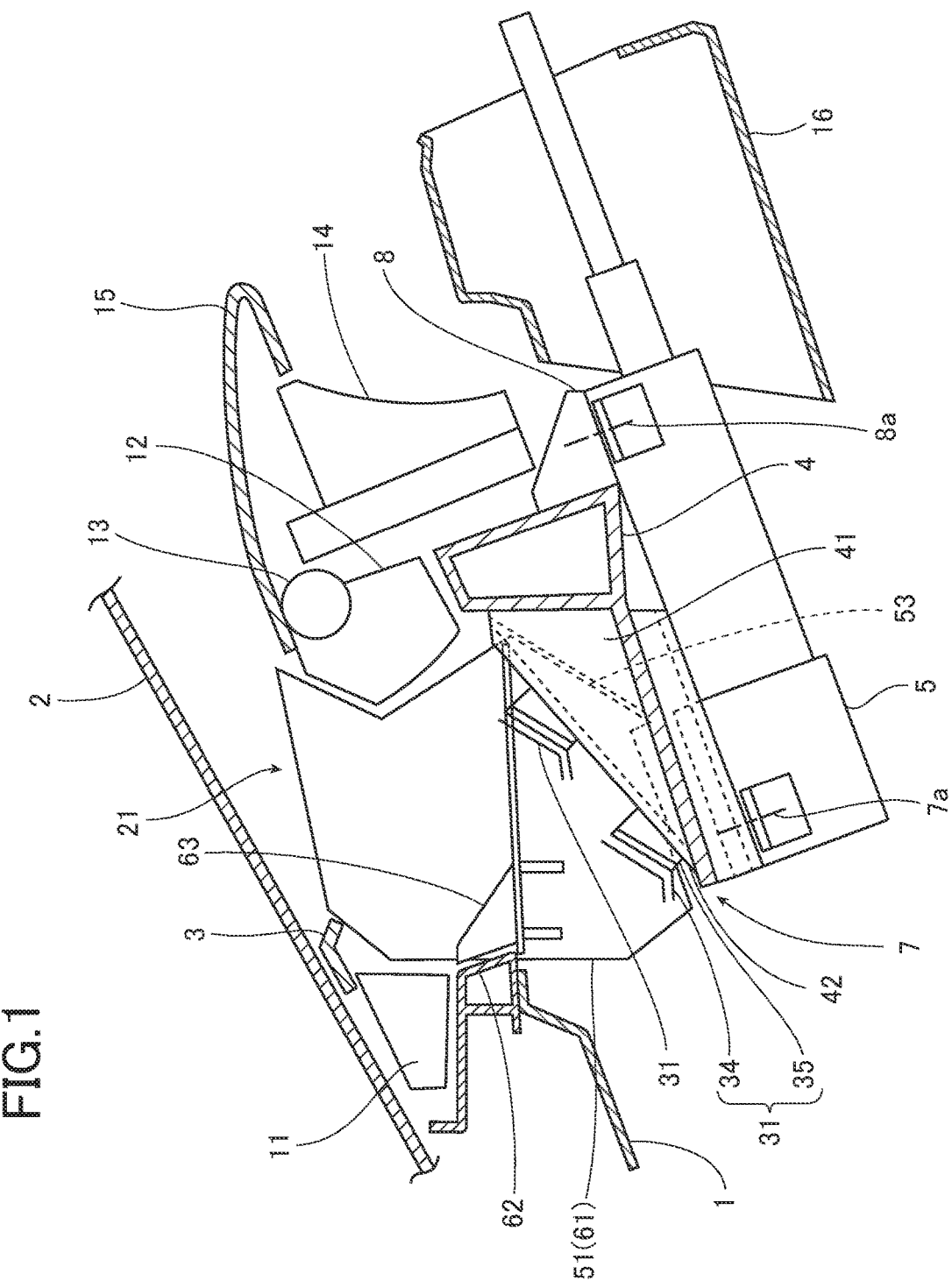
FIG. 1 is a side sectional view of a front portion of a vehicle interior showing a mounting structure for a head up display according to the present embodiment.
Figure 2:
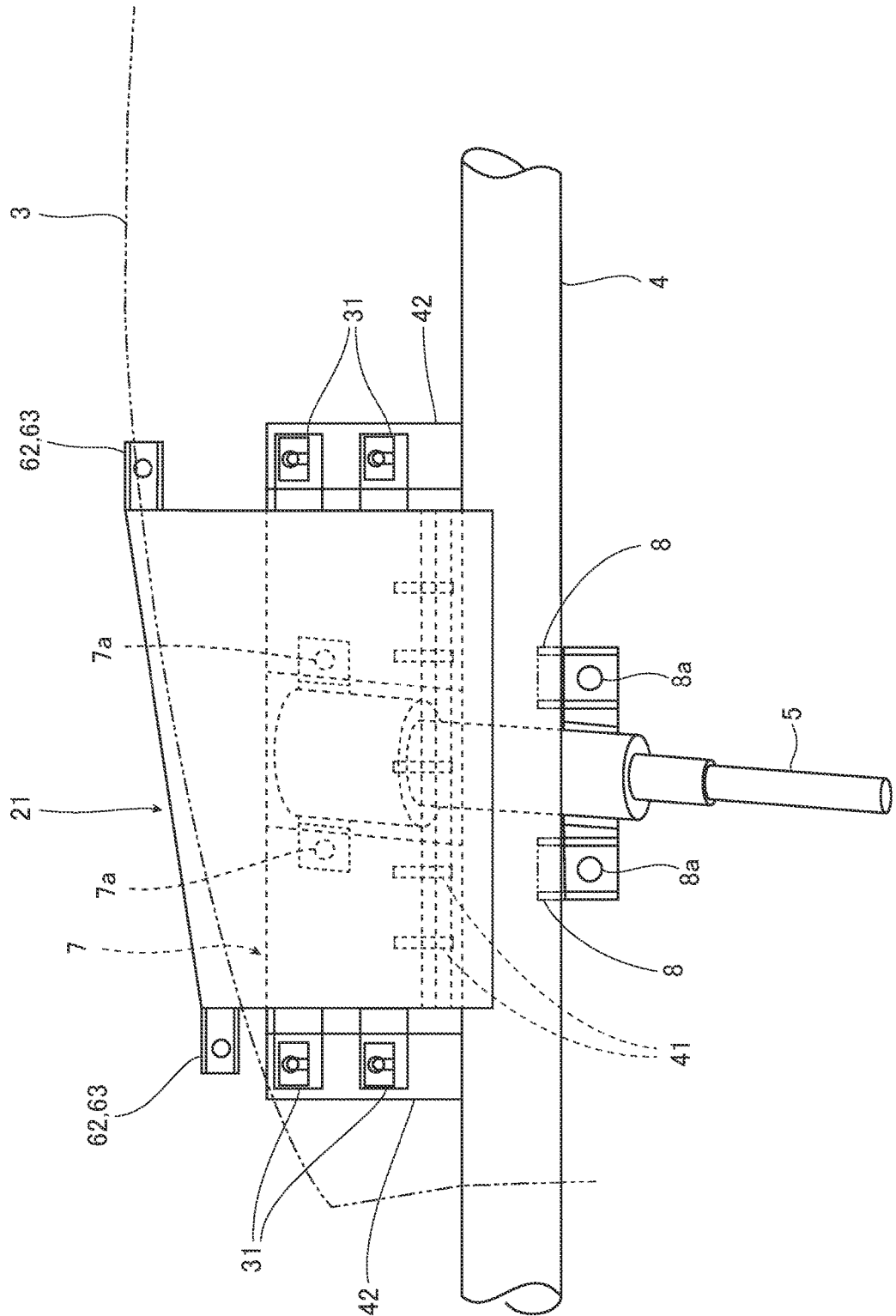
FIG. 2 is a plan view of FIG. 1.

A front portion of a vehicle interior of a vehicle such as an automobile is provided with a front wall panel 1 of the vehicle interior and a windshield 2, as shown in a side sectional view of FIG. 1 and a plan view of FIG. 2. An instrument panel 3 is provided at a lower side of the windshield 2 to cover the front wall panel 1 of the vehicle.

A vehicle body strength member 4 extending in a vehicle width direction (perpendicular direction to a paper surface of FIG. 1) is disposed in an inner portion of the instrument panel 3 to be positioned in a vehicle rear side (right side in FIG. 1) of the front wall panel 1 of the vehicle interior. A column bracket to mount a steering column 5 is provided at a lower portion of the vehicle body strength member 4. The column bracket is divided into a column lower bracket 7 disposed at a vehicle front side and a column upper bracket 8 disposed at the vehicle rear side. The steering column 5 and the column lower bracket 7, and the column upper bracket 8 are fixedly fastened by fastening/fixing parts 7a and 8a, respectively.

Air conditioning ducts 11, 12, harnesses 13 which are bundles of wires, and metering apparatuses 14 are further provided on an upper side of the inner portion of the instrument panel 3 in order from the vehicle front side. A meter hood 15 covering the metering apparatuses 14 is integrally or separately provided on the instrument panel 3. A column cover 16 is mounted on a portion of the steering column 5 protruding from the instrument panel 3.

Here, the front wall panel 1 of the vehicle interior is a dash panel partitioning between the vehicle interior and an engine room. The vehicle body strength member 4 is called a cross-car beam or steering support member, and is usually formed by a circular pipe made of a metal. In this case, the vehicle body strength member 4 has a non-circular section made of a metal or light alloy, for example, a rectangular section. Here, the vehicle body strength member 4 may be formed by either the circular pipe or the rectangular section.

The embodiment has the following configuration based on the basic configuration as described above.

(1) As described above, the column bracket (the column lower bracket 7 and the column upper bracket 8) that mounts the steering column 5 is provided at the lower portion of the vehicle body strength member 4 which extends in the vehicle width direction and is disposed in the vehicle rear side of the front wall panel 1 of the vehicle interior. The head up display unit 21 is mounted on the column bracket (the column lower bracket 7 in this case) to be movable in a vehicle upward direction by an emergency input load from the vehicle front direction (see an operational view of FIG. 10).

Figure 3:
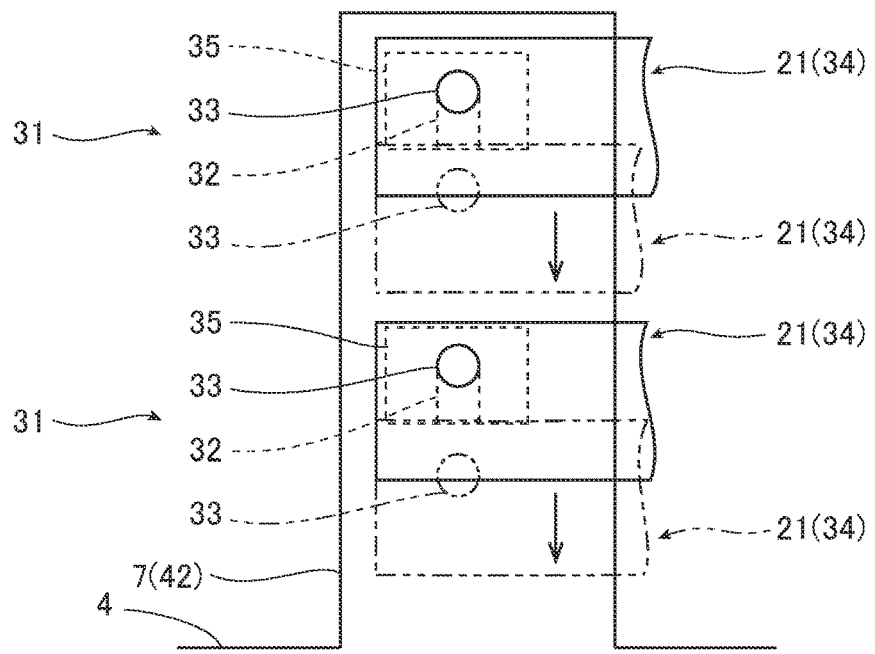
FIG. 3 is a partial enlarged view of a movable mounting portion of FIG. 2.

Here, the head up display unit 21 is located on the vehicle front side of the vehicle body strength member 4 and at an upward position of the steering column 5, in the inner portion of the instrument panel 3. The head up display unit 21 is mounted on an upper portion of the column lower bracket 7 through movable mounting parts 31 as shown in FIG. 3. The movable mounting parts 31 can be configured, for example, by forming either set of threaded holes 32 and 33 (threaded holes 32 in this case) constituting a fastening/fixing part between the head up display unit 21 and the column lower bracket 7 as long holes or slit-shaped cutouts extending in a longitudinal direction of the vehicle. The movable mounting parts 31 are provided, for example, by forward and rearward two places in both sides of the head up display unit 21 and the column lower bracket 7. In this case, the threaded holes 32 and 33 of the movable mounting parts 31 are provided in portions of mounting brackets 34 and 35 provided in the both sides of the head up display unit 21 and the column lower bracket 7. Fasteners such as bolts and nuts not shown are used, in which each bolt is threaded in the threaded hole from a perpendicular direction to a plane and each nut is threaded on the bolt.

Figure 4:
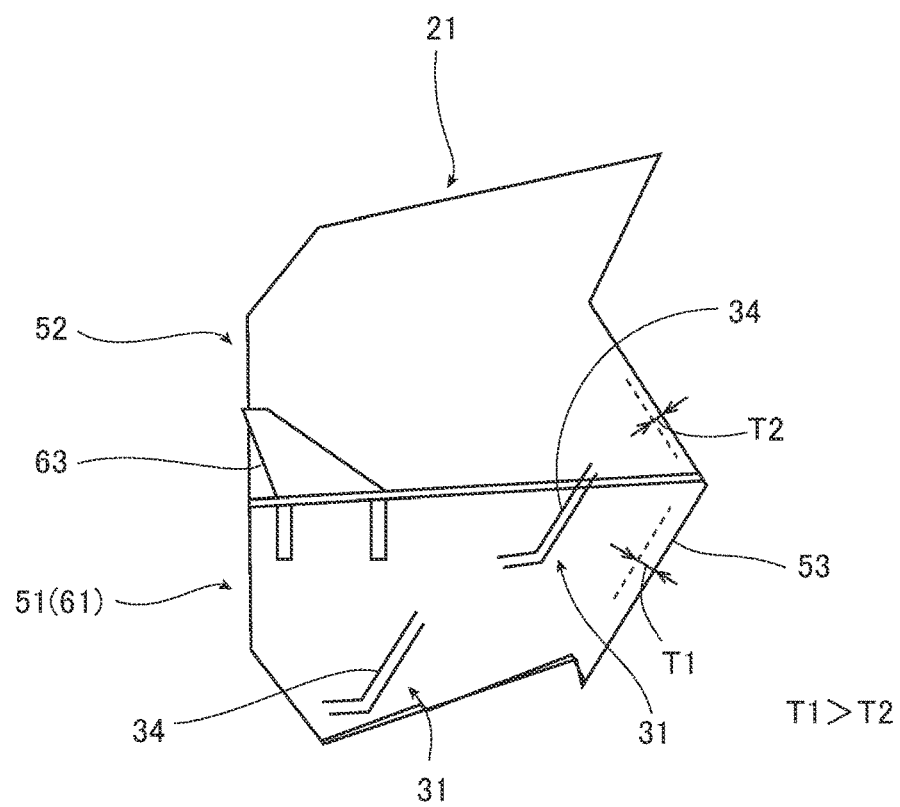
FIG. 4 is a side view showing an external shape of a head up display unit.
Figure 5A:
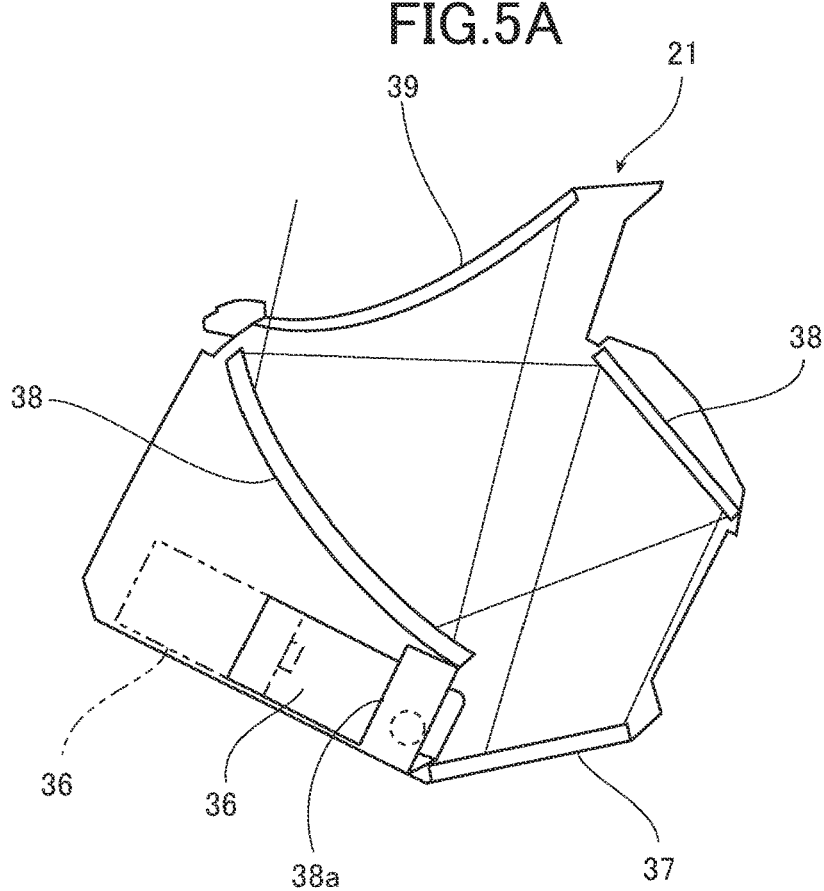
FIG. 5A is a side view showing an internal structure of the head up display unit.
Figure 5B:
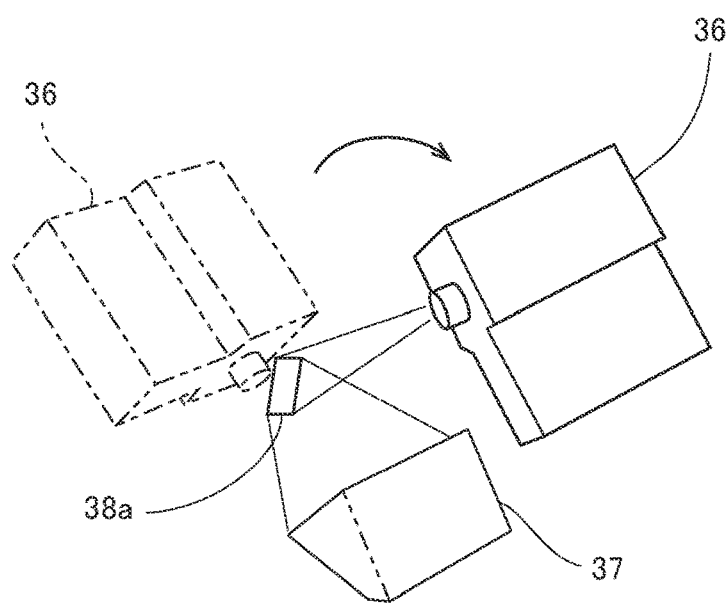
FIG. 5B is a perspective view showing the internal structure of the head up display unit.

Then, the head up display unit 21 is configured to unitize into one configuration of a head up display device that can display operating information etc. superimposed on a scene seeing through the windshield 2 of the vehicle. The head up display unit 21 includes a casing as shown in FIG. 4. The casing is provided with an image forming apparatus 36 (for example, a DLP unit (Digital Light Processing (Registered Trademark) unit) capable of forming an image, a screen 37 projecting the image formed by the image forming apparatus 36, and an optical system 38 such as a mirror (one or a plurality of plane mirrors or concave mirrors) guiding the image projected on the screen 37 to the windshield 2, which are disposed in the casing, as shown in FIGS. 5A and 5B. Here, an upper portion of the casing and a portion of the instrument panel 3 corresponding thereto are provided with windows 39, openings or the like for passing through the projected image. It is possible to accomplish the miniaturization of the head up display unit 21 shown in FIGS. 5A and 5B in the front and rear direction of the vehicle by turning the image forming apparatus 36 by 90 degrees from a state shown in an imaginary line to a state shown in a full line (to be disposed sideways) and adding an optical system 38a such as a small-sized reflection mirror between the image forming apparatus 36 and the screen 37.

(2) As shown in FIGS. 1 and 2, an inclination guiding part 41 of backward rise that guides the movement of the head up display unit 21 to the vehicle upward direction is provided on the column bracket (the column lower bracket 7 in this case)

Here, the inclination guiding part 41 has an inclination angle such that the head up display unit 21 can get over the vehicle body strength member 4. The inclination guiding part 41 is separately provided from the movable mounting parts 31. For example, the inclination guiding part 41 is provided between the right and left movable mounting parts 31. The inclination guiding part 41 is formed such as a triangular rib provided on an upper surface of the column lower bracket 7. A plurality of triangular rib-shaped inclination guiding parts 41 is provided at predetermined intervals in the vehicle width direction.

Note that the brackets 34 and 35 of the movable mounting parts 31 are formed to have surfaces of the same inclination angles as the inclination guiding parts 41. The brackets 35 of the movable mounting parts 31 may be therefore provided on brackets 42 each having an inclined shape, as needed.

(3) As shown in FIG. 4, the casing of the head up display unit 21 has at least a lower casing 51 and an upper casing 52. The lower casing 51 is set to have a higher strength than that of the upper casing 52. Further, an inclined guiding surface 53 guided by the inclination guiding parts 41 is provided on a lower surface of the lower casing 51.

Here, since the head up display unit 21 has in the inner portion thereof the optical system 38 as described above, it uses a metallic casing (for example, a casing made of aluminum die-cast) in order to always maintain high position precision regardless of change in environmental temperature. In this case, a difference between the strengths of the lower casing 51 and the upper casing 52 is set by configuring the lower casing 51 to be larger than the upper casing 52 in wall thickness (wall thickness T1>wall thickness T2). The above-mentioned guiding surface 53 is provided at a corner portion in the vehicle rear side on a lower surface of the lower casing 51. The guiding surface 53 has the same inclination angle as that of the inclination guiding parts 41 and is configured to be slidable on the inclination guiding parts 41.

(4) The lower casing 51 is configured to act as a post bracket 61 that connects the vehicle body strength member 4 and the front wall panel 1 of the vehicle interior.

Here, the post bracket 61 is provided to restrain the swinging (for example, the turning in an upward and downward direction about a lower position of the vehicle body strength member 4 as an approximate center) in the upward and downward direction of the steering column 5 generated when travelling the vehicle. A front portion of the lower casing 51 is therefore provided with mounting parts 63 facing mounting seat surfaces 62 provided on the front wall panel 1 of the vehicle interior. The mounting parts 63 have a large strength in the upward and downward direction, but a smaller strength in the vehicle front and rear direction (compared to the strength in the upward and downward direction).

Figure 6A:
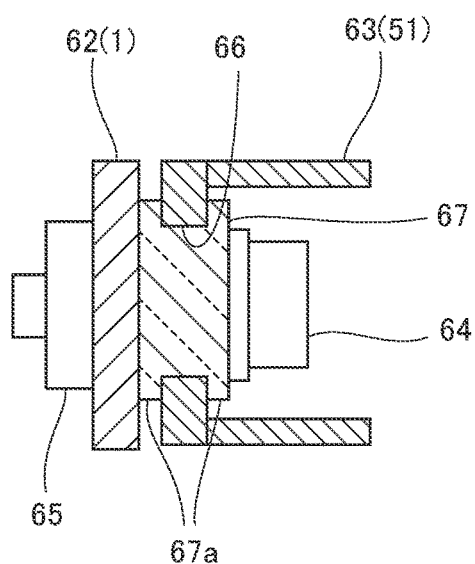
FIG. 6A is a longitudinal sectional view showing a mounting portion between a front wall panel of the vehicle interior and a front portion of the head up display unit, as viewed from a side.
Figure 6B:
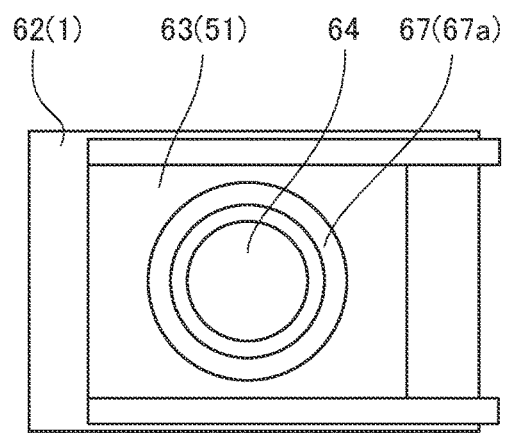
FIG. 6B is a view showing the mounting portion between the front wall panel of the vehicle interior and the front portion of the head up display unit, as viewed from a vehicle rear side.
Figure 7:
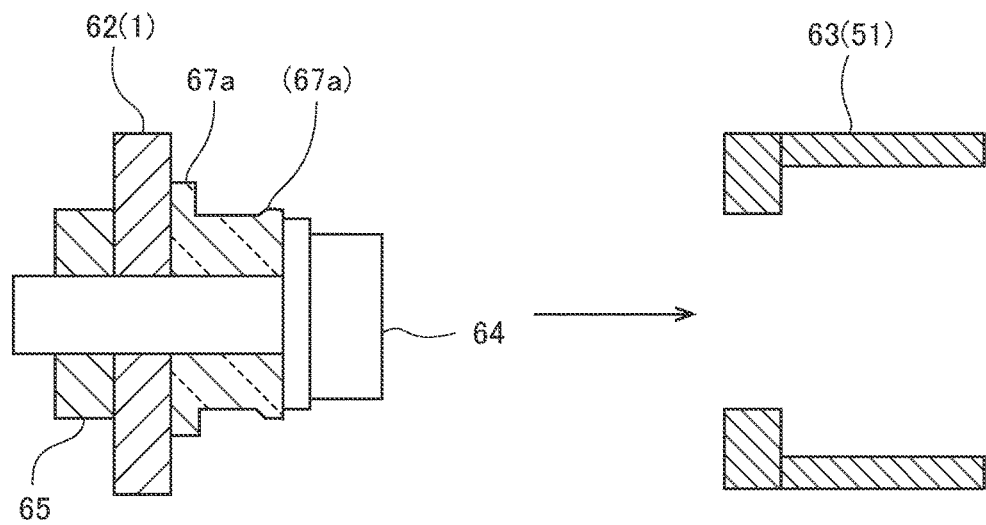
FIG. 7 is a view showing an operation state of FIG. 6A.

More specifically, the mounting seat surfaces 62 of the front wall panel 1 of the vehicle and the mounting parts 63 of the front portion of the lower casing 51 can be approximately fastened and fixed in the vehicle front and rear direction by fasteners such as bolts 64 and nuts 65, as shown in FIGS. 6A and 6B, for example. The head up display unit 21 is removed to the vehicle rear side by engaging resinous collars 67 having at both ends thereof flange portions 67a in threaded holes 66 provided in the mounting parts 63 of the lower casing 51 and by one of the flange portions 67a being broken by the emergency input load from the vehicle front direction such that the mounting parts 63 of the front portion of the lower casing 51 are disengaged from the bolts 64, as shown in FIG. 7. In this case, the threaded holes 66 each have a larger diameter than that of a head of the bolt, and the flange portions 67a of the collars 67 each have a larger diameter than that of the threaded hole 66.

Figure 8A:
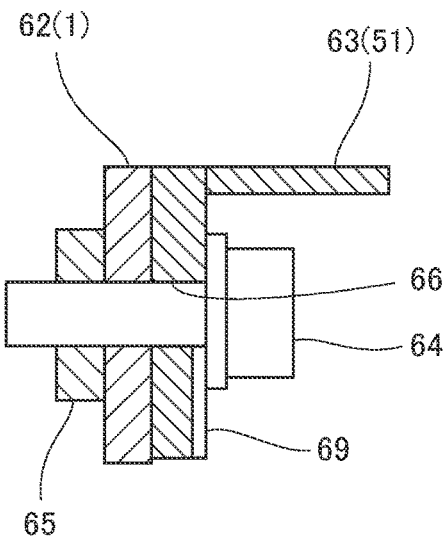
FIG. 8A is a longitudinal sectional view showing another example of the mounting portion between the front wall panel of the vehicle interior and the front portion of the head up display unit, as viewed from a side.
Figure 8B:
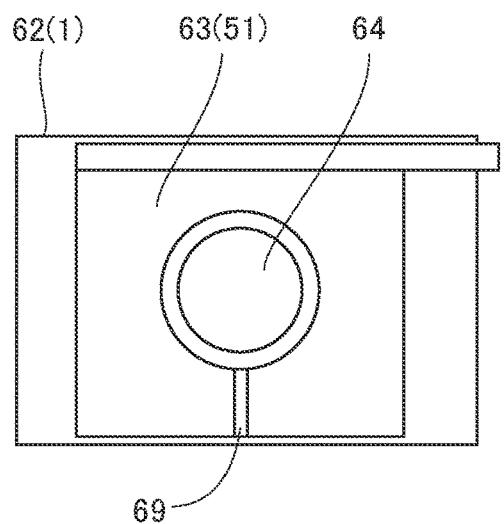
FIG. 8B is a longitudinal sectional view showing the other example of the mounting portion between the front wall panel of the vehicle interior and the front portion of the head up display unit, as viewed from the side.
Figure 8C:
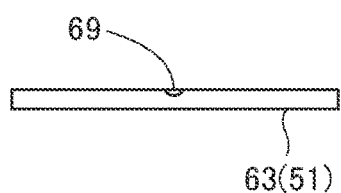
FIG. 8C is an end view showing the other example of the mounting portion between the front wall panel of the vehicle interior and the front portion of the head up display unit and showing a mounting portion of a lower casing as viewed from below.
Figure 9A:
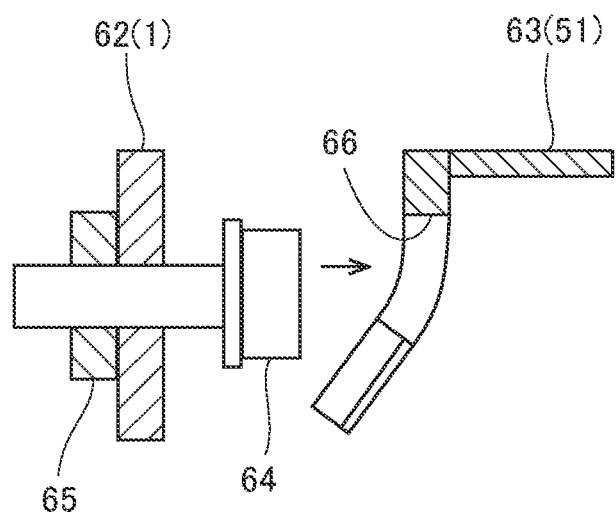
FIG. 9A is a view showing an operation state of FIG. 8A.
Figure 9B:
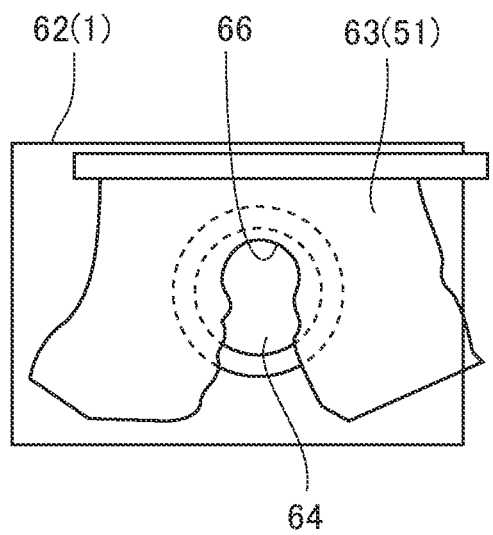
FIG. 9B is a view showing an operation state of FIG. 8B.

Alternatively, the head up display unit 21 may be removed to the vehicle rear side by providing groove-shaped cutouts 69 formed in the mounting parts 63 (mounting surfaces facing the mounting seat surfaces 62) of the front portion of the lower casing 51 and extending downward from the threaded holes 66, as shown in FIGS. 8A to 8C and by the mounting parts 63 (mounting surfaces facing the mounting seat surfaces 62) being broken along the cutouts 69 due to the emergency input load from the vehicle front direction such that the mounting parts 63 of the front portion of the lower casing 51 are deformed to remove from the bolts 64, as shown in FIGS. 9A and 9B.

<Effects>

According to the embodiments as described, the following effects can be acquired.

Figure 10:
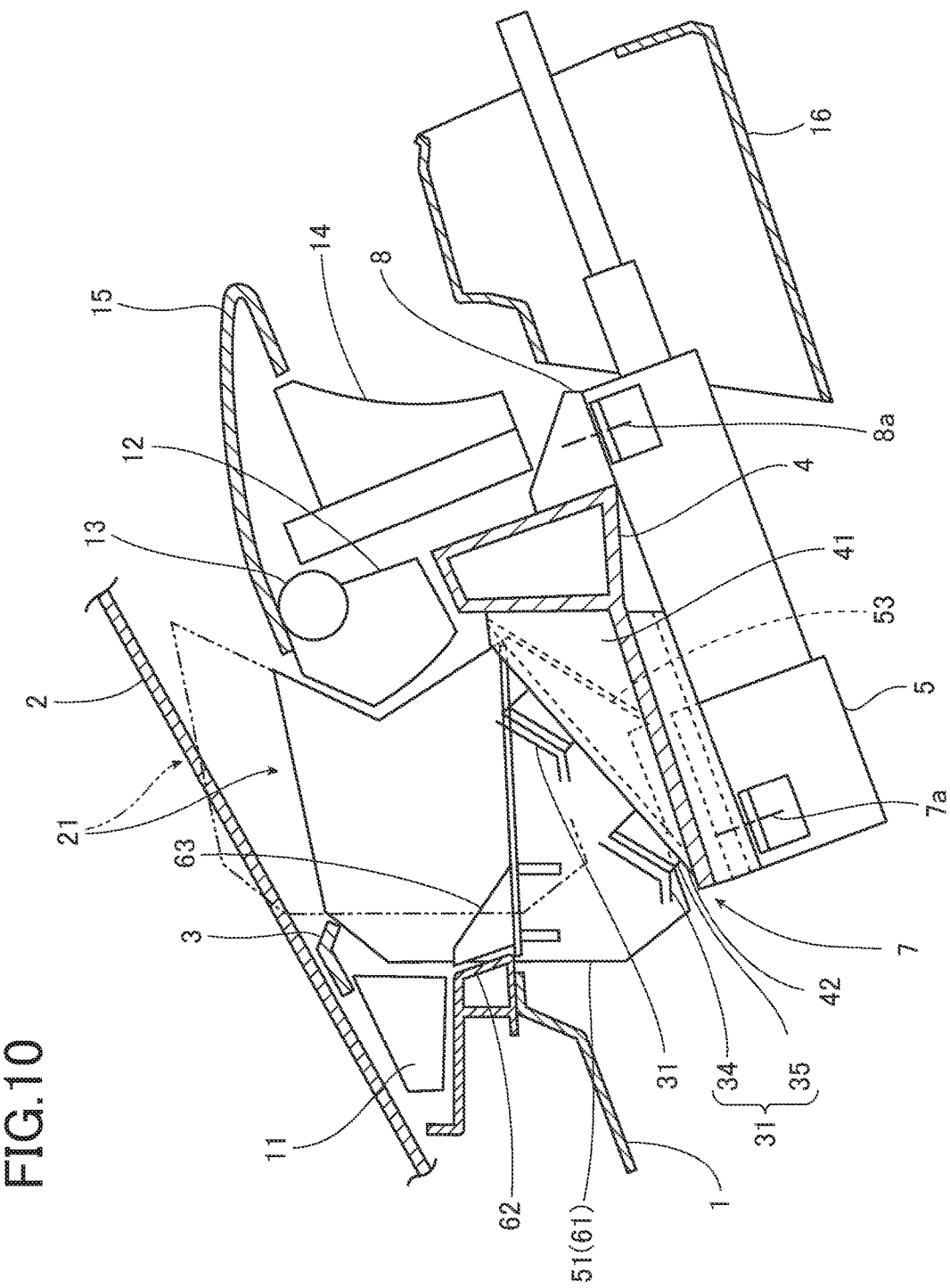
FIG. 10 is an operation view to an emergency input load from a vehicle front direction.

(1) The head up display unit 21 is mounted on the column bracket to be movable to the vehicle upward direction, as shown in FIG. 10. The head up display unit 21 can be thereby efficiently mounted on a position of the front portion of the vehicle interior (in the instrument panel 3) with space-saving, and the head up display unit 21 can be separated from the vehicle body strength member 4 or the steering column 5 in response to the emergency input load from the vehicle front direction and retracted to the vehicle upward direction alone. As a result, it can be prevented that the head up display unit 21 evacuates the vehicle body strength member 4 or the steering column 5 by the emergency input load from the vehicle front direction. With this, it is possible to reasonably provide a large-sized head up display unit 21 having much information that can display in the inner portion of the instrument panel 3.

(2) The inclination guiding part 41 of backward rise is provided on the column bracket (the column lower bracket 7). The movement of the head up display unit 21 to the vehicle upward direction can be thereby guided by the inclination guiding part 41. In addition, because the inclination guiding part 41 is formed to have the backward rise, the inclination guiding part 41 guides the head up display unit 21 above the vehicle body strength member 4 to retract not to interfere with the vehicle body strength member 4.

(3) The guiding surface 53 is provided on the lower casing 51 which is provided to increase the strength of the head up display unit 21. It is thereby possible to guide the head up display unit 21 to the vehicle upward direction and the vehicle rear direction and securely retract along the inclination guiding parts 41 by the guiding surface 53 provided on the portion of the increased strength of the head up display unit 21.

(4) The lower casing 51 of the head up display unit 21 is configured to use as the post bracket 61. The lower casing 51 of the head up display unit 21 thereby has a function of the post bracket 61. It is not therefore necessary to provide the exclusive post bracket 61. As a result, it is possible to accomplish cost reduction by reduction of the number of parts and improved space efficiency in the instrument panel 3. In addition, because the lower casing 51 of the head up display unit 21 is configured to be separated from the front wall panel 1 of the vehicle, the head up display unit 21 can be prevented from disturbing the load absorption.

Although the embodiment has been described with reference to the drawings, the embodiments are mere examples. Accordingly, changes in design within a scope that does not depart from the gist should be, of course, included in the embodiments without being limited to only the configuration of the embodiments. In addition, for example, in a case where a plurality of configurations is included in each embodiment, of course, a possible combination of the configurations should be included in the embodiments, even if there is no explanation, in particular. If a plurality of embodiments or modifications is disclosed, of course, a possible combination of configuration across them should be included in the embodiments, even if there is no explanation, in particular. As to configurations shown in drawings, they should be included in the embodiments, even if there is no explanation, in particular. Furthermore, the word, "etc." is used to include equivalents. If words such as "approximate" "about" and "degree" exist, they are used in a meaning including things of a range and precision recognized in common-sense.

REFERENCE SIGNS LIST 1 front wall panel of vehicle interior
4 vehicle body strength member
5 steering column
7 column lower bracket (column bracket)
21 head-up display unit
41 inclination guiding part
51 lower casing (casing)
52 upper casing (casing)
53 guiding surface
61 post bracket

The invention claimed is:
1. A mounting structure for a head up display comprising:
a vehicle body strength member at a vehicle rear side of a front wall panel of a vehicle interior, the vehicle body strength member extending in a vehicle width direction;
a column bracket for mounting a steering column, the column bracket being at a lower portion of the vehicle body strength member;

a head up display unit on a vehicle front side of the vehicle body strength member, the head up display unit being at an upward position of the steering column; and
an inclination guiding part of backward rise on the column bracket,
wherein the inclination guiding part has an inclination angle such that the head up display unit is configured to slide along the vehicle body strength member to a vehicle upward direction by an emergency input load from a front direction of the vehicle.

2. The mounting structure according to claim 1,
wherein a casing of the head up display unit includes at least a lower casing and an upper casing,
a wall thickness of the lower casing is larger than a wall thickness of the upper casing, and
an inclined guiding surface configured to be guided by the inclination guiding part is on a lower surface of the lower casing.

3. The mounting structure according to claim 2, wherein the lower casing of the head up display unit is configured to act as a post bracket that connects the vehicle body strength member and the front wall panel of the vehicle interior.

4. A mounting structure for a head up display comprising:
a vehicle body strength member at a vehicle rear side of a front wall panel of a vehicle interior, the vehicle body strength member extending in a vehicle width direction;
a column bracket for mounting a steering column, the column bracket being at a lower portion of the vehicle body strength member; and
a head up display unit,
wherein:
the head up display unit is mounted on the column bracket so as to be movable to a vehicle upward direction by an emergency input load from a front direction of the vehicle, and
the head up display unit is configured such that the head up display unit does not rotate upon movement by the emergency input load from the front direction of the vehicle.

5. The mounting structure according to claim 4, wherein an inclination guiding part of backward rise configured to guide the movement of the head up display unit to the vehicle upward direction is on the column bracket.

* * * * *